United States Patent [19]
Takahashi et al.

[11] Patent Number: 5,847,845
[45] Date of Patent: Dec. 8, 1998

[54] BOOK DOCUMENT READING DEVICE

[75] Inventors: Hiroshi Takahashi, Kawasaki; Kazunori Bannai, Tokyo; Tetsuya Fujioka, Yokohama; Kazushige Taguchi, Warabi; Susumu Shiina, Tokyo, all of Japan

[73] Assignee: Ricoh Company, Ltd., Tokyo, Japan

[21] Appl. No.: 474,244

[22] Filed: Jun. 7, 1995

Related U.S. Application Data

[62] Division of Ser. No. 203,316, Mar. 1, 1994.

[30] Foreign Application Priority Data

Mar. 1, 1993 [JP] Japan ...................... 5-40180

[51] Int. Cl.$^6$ .............. H04N 1/04; H04N 1/00; G03B 27/32; G03B 27/52
[52] U.S. Cl. ................ 358/475; 358/474; 358/450; 358/494; 358/497; 355/25; 399/362
[58] Field of Search ................. 358/475, 474, 358/401, 450, 406, 494, 497; 355/25; 399/362

[56] References Cited

U.S. PATENT DOCUMENTS

| | | | |
|---|---|---|---|
| 4,816,921 | 3/1989 | Akiyama et al. | 358/488 |
| 5,325,213 | 6/1994 | Takahashi et al. | 358/474 |
| 5,359,207 | 10/1994 | Turner | 257/81 |
| 5,583,662 | 12/1996 | Takahashi et al. | 358/474 |
| 5,610,720 | 3/1997 | Fujioka et al. | 358/296 |

*Primary Examiner*—Kim Vu
*Assistant Examiner*—Tia M. Harris
*Attorney, Agent, or Firm*—Oblon, Spivak, McClelland, Maier & Neustadt, P.C.

[57] ABSTRACT

An image reading device capable of preventing, by increasing the quantity of light at the center or bound portion of a spread book document, the quantity of light from becoming short and preventing density from becoming irregular due to the deviation of a focus. At and around the center of a spread book document where the document is bound, the quantity of light for illumination or the amplification gain of image data read from the document is increased. A plurality of fluorescent lamps illuminate the surface of the document at the upstream side and downstream side with respect to an intended scanning direction. When the edge of the document is to be detected, only one of the lamps is turned on to enhance the stripe pattern representative of the stepped edge portion of the document.

7 Claims, 15 Drawing Sheets

SCANNING POSITION (mm)

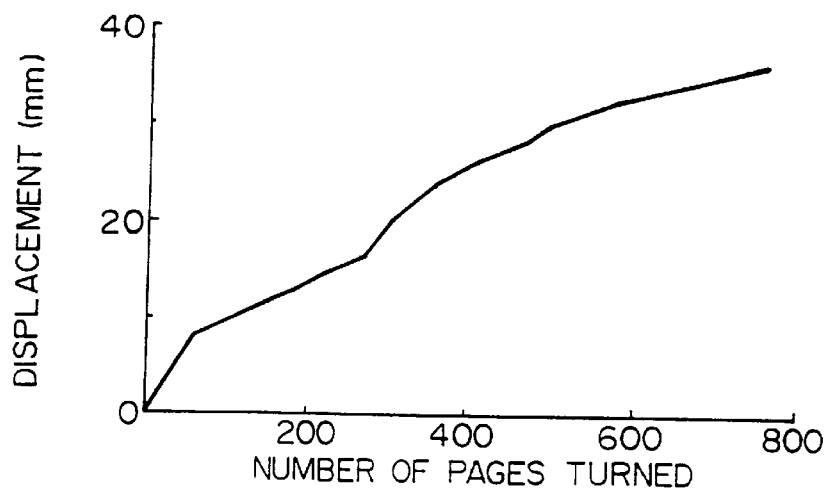
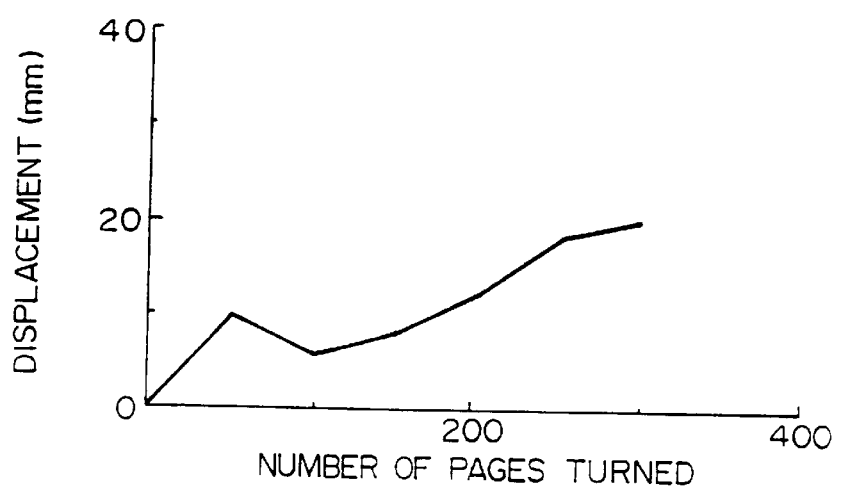
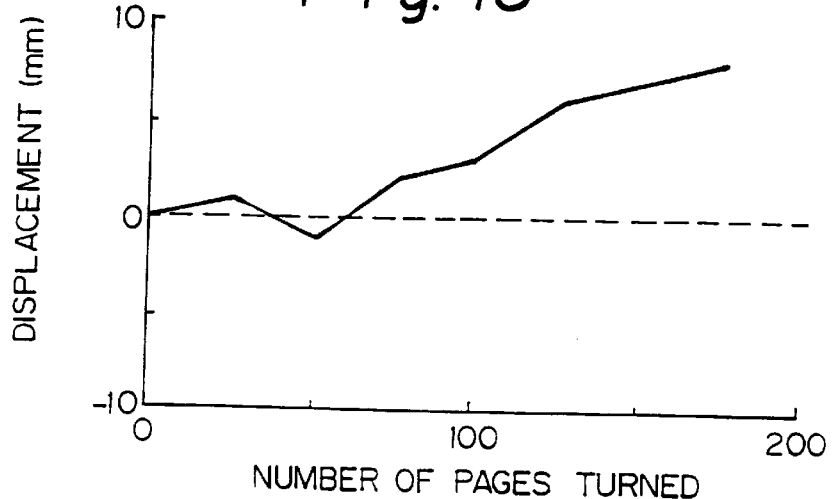

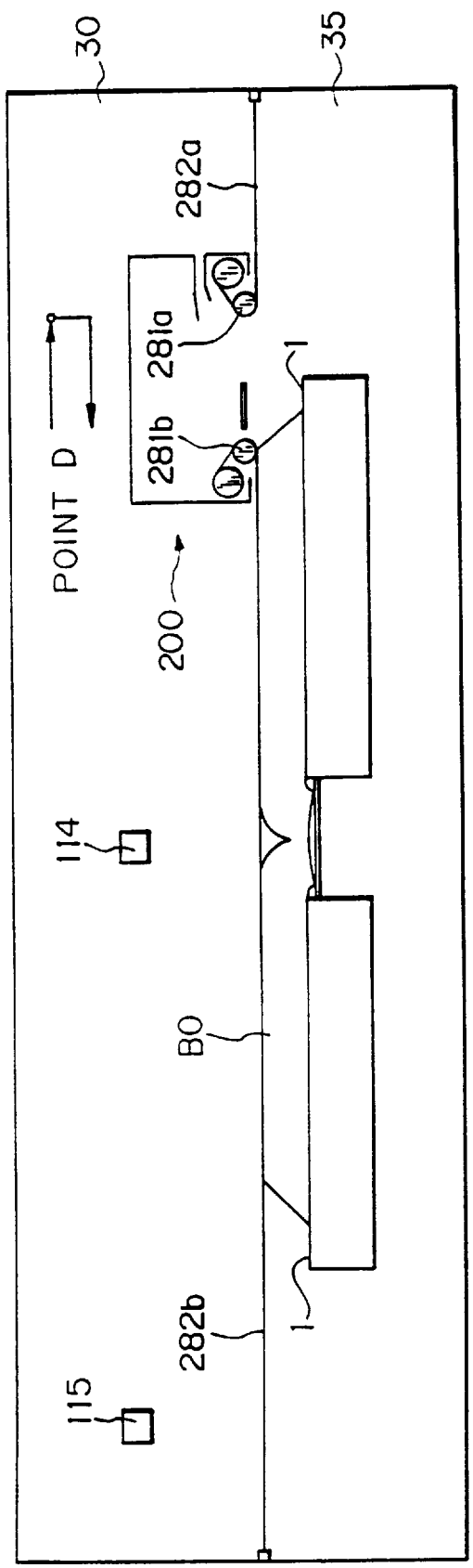

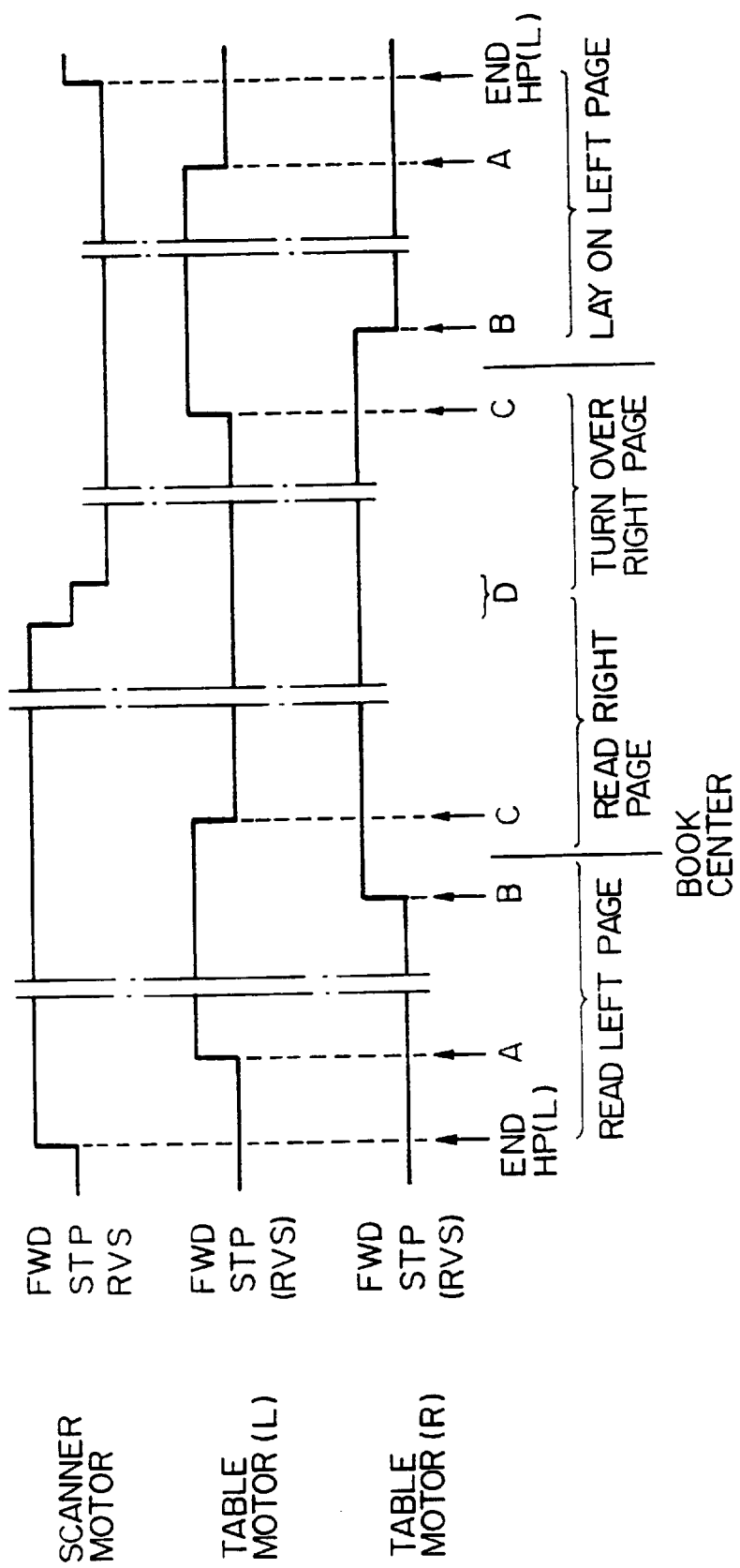

BOOK DOCUMENT READING DEVICE

This is a Division of application Ser. No. 08/203,316 filed on Mar. 1, 1994.

BACKGROUND OF THE INVENTION

The present invention relates to an image reading device for a copier, facsimile apparatus or similar image forming apparatus and, more particularly, to a device for reading the image of a book document spread on a document table by scanning the surface of the document.

An automatic document feeder (ADF) is extensively used with an image forming apparatus of the kind described as an image reading device. The ADF automatically transports a sheet document to a reading position, reads the image of the document, and then discharges the document from the reading device. So far as the document is a sheet document, the ADF can read it automatically. However, regarding a book document, it is extremely difficult to automate the page turning operation of the ADF. The only measure left at the present stage of development is to turn the pages of a book manually. Although various methods and means have, of course, been proposed for reading a book document automatically, most of them are merely conceptual and far from practicality.

In the light of this, Japanese Patent Laid-Open Publication (Kokai) No. 2-193589 discloses a device capable of reading a book document while turning the pages thereof with a page turning and reading unit, or scanning unit as referred to hereinafter. The scanning unit has thereinside page receiving means, page attracting means, page separating means, reading means, etc. Specifically, the scanning unit has a page turning belt extending along the surface of a document table. While a document is laid on the document table in a spread position between the surface of the table and the belt, the scanning unit is moved relative to the document while causing the belt to form a roundabout portion moving away from the table. With this kind of device, it is possible to fully automate the page turning and image reading operation which has heretofore been time and labor consuming and, therefore, to implement a multifunction image reading system remarkably enhancing the productivity of, for example, a copier.

When a book document or similar relatively thick document is laid in a spread position, the center or bound portion of the document forms a recess curved toward the back of the document. Assume the previously stated device of the type having image reading means constructed into a unit and causing it to read the spread pages of a book in contact therewith, or the device of the type causing a scanner to read such pages through a glass platen as in an ordinary copier. Then, the reading means of such a device cannot follow the above-mentioned curved recess of the spread book. In this condition, it is likely that the quantity of light becomes short at the curved recess and/or that an irregular density distribution is brought about by the deviation of a focus.

On the other hand, the device stated previously reads the surface of a book which is spread on a document table face up. This kind of scheme has a drawback that even when the spread book is pressed from above or from below, the surface of the book cannot be made entirely flat since the book has certain thickness. Consequently, a shadow is apt to appear in the resulting image when the book is illuminated only in one direction. This is particularly noticeable at the center or bound portion of the document due to the recess having a substantial depth.

Even when book documents or similar relatively thick documents dealt with have the same size, the positions of the edges of the spread pages change with the thickness of the book, the positions of the spread pages, etc. Preferably, therefore, the position for starting reading an image and the position for starting turning the page, among others, should be set adequately in matching relation to the actual position of the book surface, the actual position of an image, etc. Particularly, in the device having a page turning capability, it is preferable that the reading operation begins at a position matching a change in the spread position of the book attributable to page turning. For these reasons, the previously stated device scans the a spread book to read a stripe pattern representative of the sequentially stepped edge portion of the book, detects the edge of the book surface on the basis of the resulting data, and then sets a particular position for starting reading the book or starting turning the page. However, assume that a plurality of illuminating means are respectively arranged at the upstream side and downstream side with respect to the scanning direction and illuminate the surface of a spread book in order to eliminate a shadow, as stated earlier. Then, light from such illuminating means prevents the stripe pattern representative of the stepped edge portion of the book from appearing, thereby obstructing reliable edge detection based on the data read from the book.

SUMMARY OF THE INVENTION

It is, therefore, an object of the present invention to provide an image reading device which prevents, by increasing the quantity of light at the center or bound portion of a spread book document, the quantity of light from becoming short and prevents the density from becoming irregular due to the deviation of a focus.

It is another object of the present invention to provide an image reading device which insures reliable edge detection while eliminating a shadow at the bound portion of a book document.

In accordance with the present invention, an image reading device comprises a document table for laying a book document in a spread position face up, and an image reading unit for reading an image printed on the book document by optically scanning the surface thereof. The quantity of light for illuminating the book document is increased at and around the center portion of the book document where the document is bound.

Also, in accordance with the present invention, an image reading device comprises a document table for laying a book document in a spread position face up, and an image reading unit for reading an image printed on the book document by optically scanning the surface of thereof. The amplification gain of image data read from the book document is increased at and around the center portion of the book document where document is bound.

Further, in accordance with the present invention, an image reading device comprises a document table for laying a book document in a spread position face up, and an image reading and scanning unit for reading an image printed on the book document by optically scanning a surface thereof. The image reading and scanning unit has a plurality of illuminating means respectively arranged at the upstream side and downstream side with respect to the direction in which the image reading and scanning unit reads the book document.

BRIEF DESCRIPTION OF THE DRAWINGS

The above and other objects, features and advantages of the present invention will become more apparent from the following detailed description taken with the accompanying drawings in which:

FIG. 11 is a graph representative of the transition of the left edge of a book document attributable to the page turning operation of the scanning unit;

FIG. 12 is a graph similar to FIG. 11, showing a transition to occur when the bound portion of a book document is displaced;

FIG. 13 is a graph also similar to FIG. 11, showing a transition to occur when the bound portion of a book document is thin;

FIGS. 17–21 each shows the scanning unit in a particular condition to occur during a table press/fix mode operation; and FIG. 22 is a timing chart representative of the operations of a scanner motor and a right and a left elevation motor to occur in the table press/fix mode.

DESCRIPTION OF THE PREFERRED EMBODIMENTS

A preferred embodiment of the book document reading device in accordance with the present invention will be described hereinafter. While the present invention allows an image reading function and a page turning function implemented independently of each other, the illustrative embodiment will be described as incorporating the two functions in a single unit by way of example.

Figure 1:
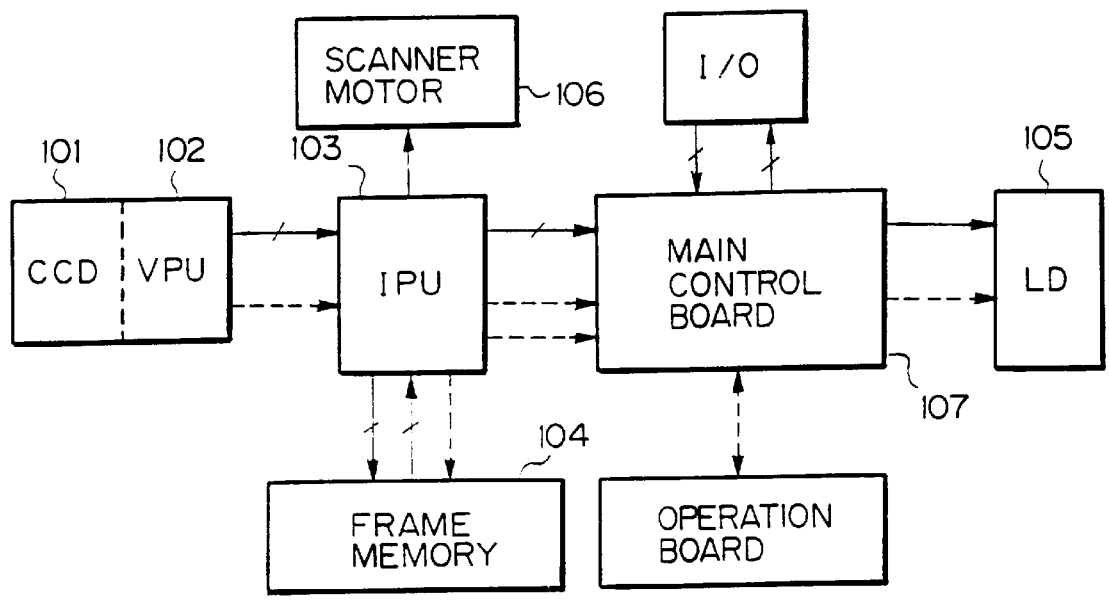
FIG. 1 is a block diagram schematically showing the flow of data to occur in a book document reading device embodying the present invention.

Referring to FIG. 1, there is shown a specific system in which a document reading function embodying the present invention and having a page turning capability (referred to as a TPS (Turn the Page Scanner) hereinafter) reads a book document and outputs the resulting image data to an electrophotographic printer. As shown, the system is generally made up of an image reading or scanning section and an image data processing section which belong to the TPS, and an image forming section. Located at the right end position of a carriage, the scanning section has a CCD (Charge Coupled Device) image sensor 101 and a VPU (Video Processing Unit) 102. The VPU 102 generates a signal for driving the image sensor 101, corrects analog output data of the image sensor 101, and then transforms the corrected analog data to a digital signal. Specifically, the VPU 102 outputs image data in the form of dots each having eight dots to an IPU (Image Processing Unit) 103 at a rate of about 7.5 MHz in synchronism with a clock and a horizontal or main scan and a vertical or subscan gate signal. The IPU 103 executes magnification change and other editing and electrophotographic quality enhancement with the input image data. Finally, the IPU 103 executes tonality processing, including gamma correction, so as to output video data having four bits per dot and feasible for writing. The processed video data are written to a frame memory 104.

In the illustrative embodiment, the TPS reads a book document and a sheet document at rates of 90 mm/sec and 120 mm/sec, respectively, while an image is formed at a rate of 180 mm/sec. Hence, use is made of a frame memory 104 capable of accommodating a single page of size A3. Also, the frame memory 104 serves to project a document in a repeat copy mode and implements a broad range of magnification change in the subscanning direction. Further, the frame memory 104 is used in a page sequential mode which causes the right and left pages to be printed independently of each other. Specifically, taking advantage of the adaptability of the IPU 103 to speed, the embodiment locates the frame memory 104 having a four bits per dot configuration after the IPU 103 and writes the processed data therein. This halves the capacity required of the frame memory 104 for the eight dots per read data.

The frame memory 104 of the TPS has a capacity of 128 megabits corresponding to a single page of size A3 in terms of image data of 400 dots per inch (dpi), and it is implemented by a DRAM (Dynamic Random Access Memory). Two dots of image data are input to the frame memory 104 in parallel at a time; data are sequentially input at a rate of about 3.8 MHz. The image data stored in the frame memory 104 are output, two dots at a time, at a rate of about 7.5 MHz in synchronism with a clock and a horizontal and a vertical scan gate signal fed from the IPU 103. The image data from the memory 104 are applied to the IPU 103. The IPU 103 couples data output to the image forming speed of the printer at high speed by the frame memory 104 to serial data of about 15 MHz, further increases the speed in the horizontal scanning direction by using a FIFO (First In First Out) memory, and synchronizes them to a write clock of about 18 MHz. The four bits per dot data are converted to light emission data by pulse width modulation (PWM). The PWM data are sent to an LD (Laser Diode) controller, not shown, in synchronism with the write clock. The LD controller has an LD driver, not shown, and causes it to drive an LD 105. As a result, the LD 105 emits a laser beam to scan a photoconductive element, not shown, thereby forming a latent image thereon.

The IPU 103 controls the movement of a read carriage or scanning unit, not shown, as well. Specifically, the IPU 103 drives a scanner motor, or stepping motor, such that the carriage moves at a constant scanning speed of 120 mm/sec for a sheet document or at a constant scanning speed of 90 mm/sec for a book document, moves at a speed of 180 mm/sec in the event of a return to a home position, or moves at a speed of 120 mm/sec in the event of page turning. A main control board 107 controls an image forming sequence in response to the outputs of sensors joining in image formation and the outputs of motors, solenoids, clutches, etc.

How the embodiment reads an image and processes the resulting signal is as follows. The CCD image sensor 101 is capable of reading about 5,000 pixels at a resolution of 400 dpi and reads one line of reflections from a document in the main scanning direction at the same time. The optical data stored in the image sensor 101 are converted to an electric signal, subjected to clamping or similar waveform correction, amplified, and then subjected to analog-to-digital conversion. The digitized data are fed to the IPU 103 as an 8-bit digital signal. Specifically, the analog data are output from the image sensor 101 over two different lines EVEN and ODD. A switching IC (Integrated Circuit), not shown, is constituted by an analog switch and combines the data on the lines EVEN and ODD to produce a serial analog signal. In a book scan mode, one pixel of the combined signal is transferred at a rate of about 7.5 MHz; in synchronism with this transfer, an analog-to-digital converter (ADC), not shown, converts the analog signal to an 8-bit digital signal having 256 tones. On the other hand, to compensate for changes in the quantity of output light of a fluorescent lamp for exposure, a variable amplifier, not shown, has the amplification thereof controlled on the basis of data read out of a white reference plate.

Figure 2:
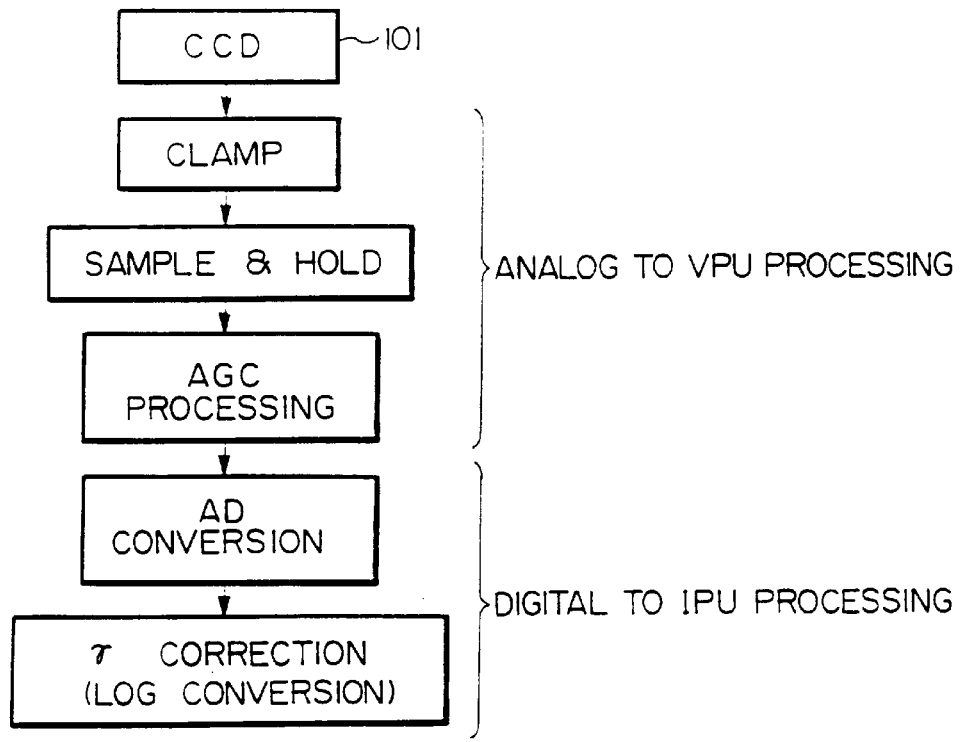
FIG. 2 is a flowchart demonstrating a scanner data processing procedure particular to the embodiment.

FIG. 2 demonstrates the procedure in which the scanning section processes data. As shown, analog data read out by the image sensor 101 and continuous in the main scanning direction are clamped to have the base level of its waveform adjusted. Then, the clamped analog data are sampled and held in synchronism with a pixel clock. This is followed by AGC (Automatic Gain Control) processing which changes the amplification of the data on the basis of the quantity of light for illumination and data level. The data undergone AGC processing is transformed to 8-bit digital data. The read data linear to the reflection density from the document is subjected to logarithmic conversion in order to handle tonality efficiently in matching relation to visual sensitivity. For the logarithmic conversion, use is made of an LUT (Look UP Table) having an input and an output of eight bits per dot.

The pixel-by-pixel digital signal representative of image densities is input to the IPU 103 to be processed thereby. The IPU 103 is made up of a plurality of LSIs (Large Scale Integrated circuits) and performs, in addition to image editing, various kinds of processing for quality enhancement, as follows:

(1) Shading correction: In the embodiment, the scanner is provided with a fluorescent lamp, or linear light source, for illumination. This, coupled with the fact that a lens is used to converge reflections, causes the quantity of light to become maximum at the center of the image sensor 101 and decrease at opposite end portions. Moreover, the CCDs constituting the image sensor 101 are different from each other in respect of sensitivity. In the light of this, the IPU 103 performs, on the basis of pixel-by-pixel data read out of the white reference plate, shading correction with both the reference plate data and the read data, thereby correcting the read data;

(2) MTF (Modulation Transfer Function) correction: In optics including a lens, peripheral pixel information are effected by, for example, the ability of the lens with the result that the corresponding output of the image sensor 101 appears blurred. To obviate this problem, the IPU 103 corrects each pixel data on the basis of the levels of pixels surrounding it, thereby producing a highly reproducible image;

(3) Magnification change in main scanning direction: In the embodiment, an image is read and written at the same resolution of 400 dpi. However, the pixel frequency of the frame memory 104 is about 15-MHz in the event of reading or about 18 MHz in the event of writing. Hence, the IPU 103 converts the frequency. In addition, the IPU 103 changes the magnification in the range of from 50% to 200% in both of the main and subscanning directions. To change the magnification, the IPU 103 performs calculation with surrounding pixel data;

(4) Gamma correction: Regarding an electrophotographic laser printer, since the density reproducing characteristic (gamma characteristic) is not linear, image densities cannot be reproduced faithfully if image data are directly applied to the printer. For faithful image reproduction, the IPU 103 selects a quantity of writing light matching a printing characteristic by referencing a conversion table.

Moreover, the IPU 103 executes other processing including masking, trimming, mirroring, black-and-white reversal or similar image conversion, detection of document size, position and density, and detection of a marker or similar extra image.

The LD 105 transforms the image data sent from the IPU 103 to corresponding optical energy. In the illustrative embodiment, the printer section optically writes an image on a photoconductive element by steering the laser beam with a polygon mirror. Specifically, the laser beam scans the photoconductive element to form an electrostatic latent image thereon. The LD 105 may be modulated by either of a pulse modulation system and a power modulation system which are conventional. The pulse modulation system modulates the exposing time in one dot while the power modulation system modulates the intensity of exposure. The embodiment uses the pulse modulation system. With such a system, the embodiment insures quality images having resolution and tonality.

Figure 3:
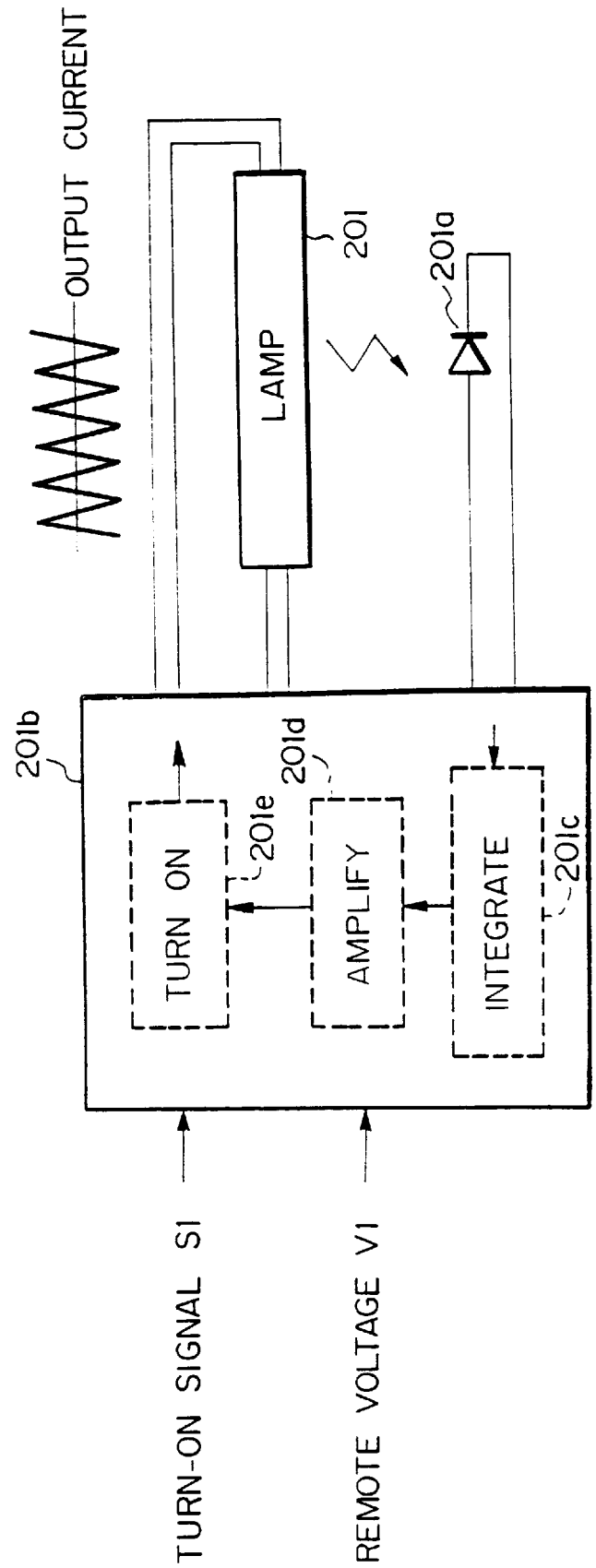
FIG. 3 is a schematic block diagram showing light control circuitry built in a scanning unit included in the embodiment.
Figure 4:
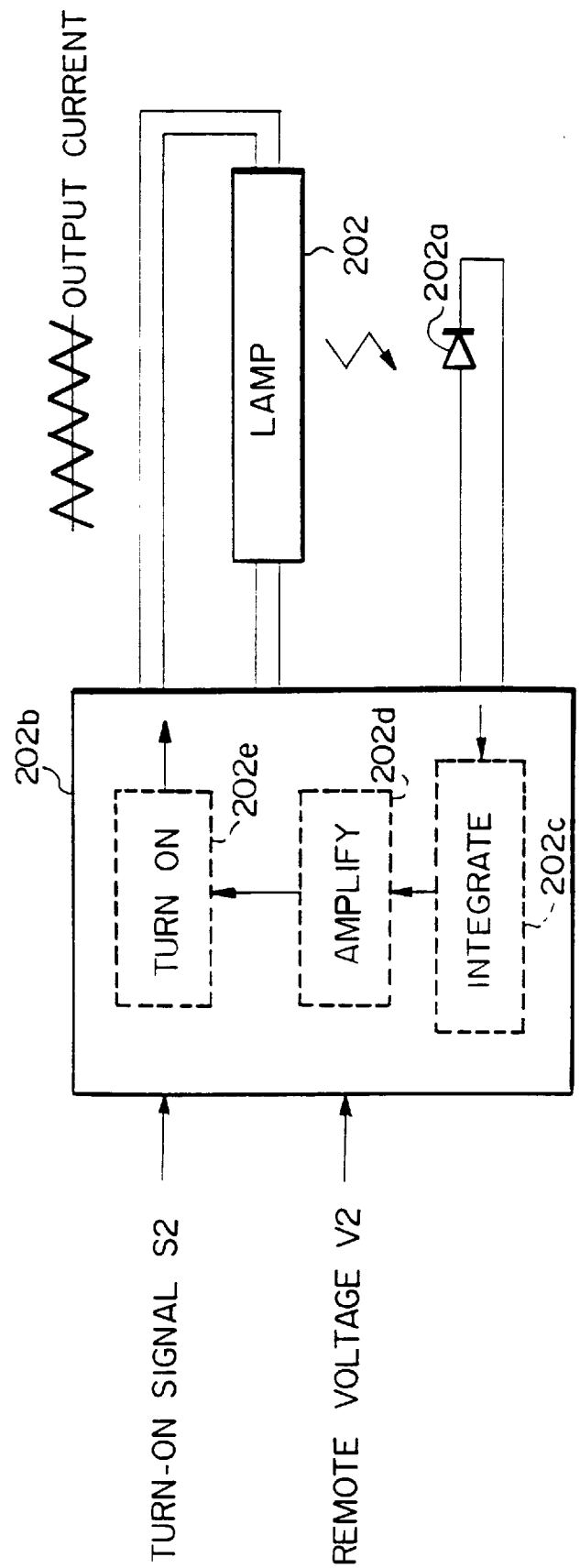
FIG. 4 is a schematic block diagram showing alternative light control circuitry.
Figure 16:
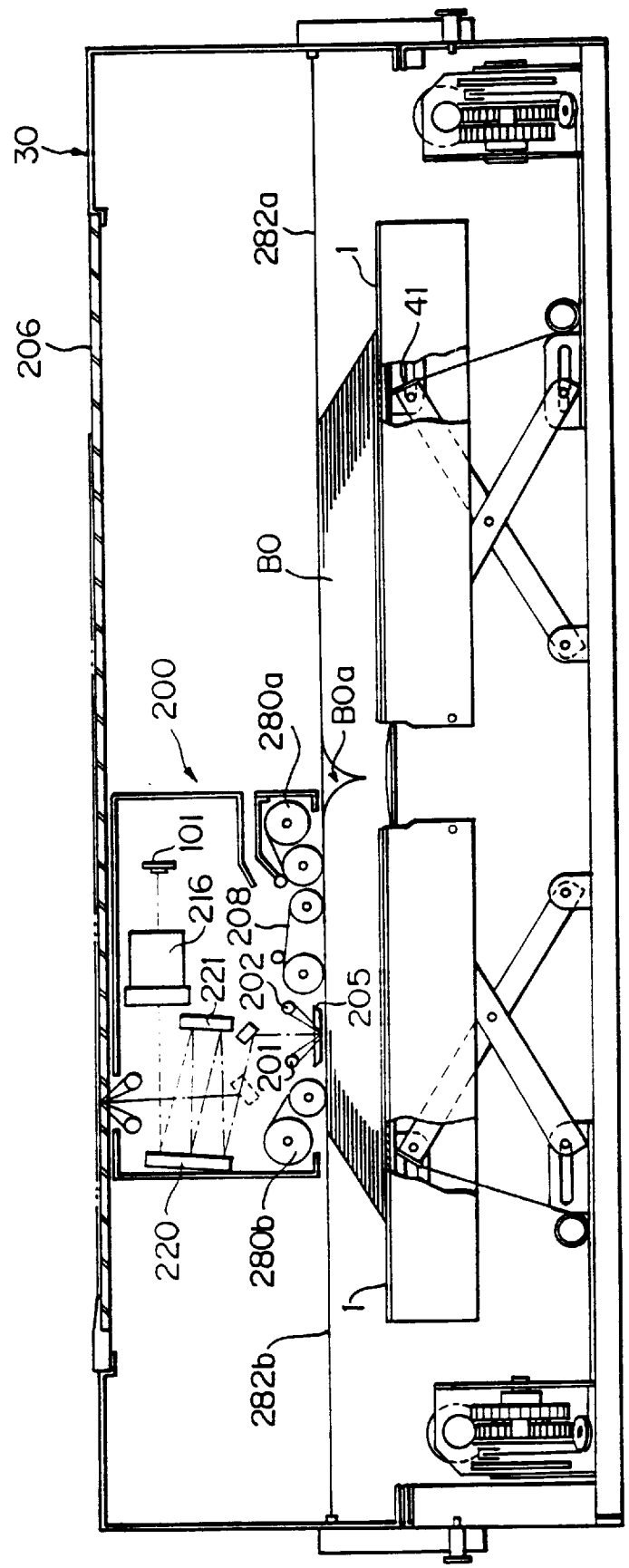
FIG. 16 is a section showing the general construction of the embodiment.

The TPS illuminates a book document, or simply book as referred to hereinafter, with the following arrangement and procedure. FIGS. 3 and 4 show light control circuitry for adjusting the quantity of light to issue from a fluorescent lamp. As shown, the embodiment has two fluorescent lamps 201 and 202 for illuminating a book. The light control circuitry associated with the lamps 201 and 202 are identical; that is, the TPS has two fluorescent lamps and two light control circuits which are controllable independently of each other. As shown in FIG. 16, a scanning unit, or carriage, 200 has a glass platen 205 at a slit position for reading a book; the slit position extends in the direction perpendicular to the scanning direction of the carriage 200. The lamps 201 and 202 assigned to books are fixed in place above and at both sides of the glass platen 205. The lamps 201 and 202 illuminate a book BO from both sides via the glass platen 205. This eliminates, when the book BO is read, irregularities in density attributable to the right/left page as well as shadows attributable to the bound portion BOa of the book BO.

The light control circuitry shown in FIGS. 3 and 4 respectively have, in addition to the lamps 201 and 202, sensors 201a and 202a responsive to the quantities of light issuing from the lamps 201 and 202, and light control circuits 201b and 202b. Implemented by photodiodes, the sensors 201a and 202a are each positioned at the rear side of the associated lamp 201 or 202 in the illuminating direction and substantially at the center in the scanning direction. The sensors 201a and 202a respectively monitor the quantities of light issuing from the lamps 201 and 202, which change with ambient temperature, so that quantities of light are controlled to a predetermined adequate quantity by feed back control. The control circuits 201b and 202b respectively have integrators 201c and 202c, amplifiers 201d and 202d, and turn-on control circuits 201e and 202e. The integrators 201c and 202c respectively average the quantities of light represented by the outputs of the sensors 201a and 202a. The amplifiers 201d and 202d respectively amplify the resulting outputs of the integrators 201c and 202c. The turn-on control circuits 201e and 202e respectively drive the lamps 201 and 202 on the basis of the differences between the target quantity of light and the actual quantities of light. Use is made of a rippleless light control system which changes the amplitude of a drive current and, therefore, the quantity of light in synchronism with the sampling of the image sensor 101, thereby preventing the density read out of a document from becoming irregular. In the illustrative embodiment, the lamps 101 and 102 are driven at a frequency of 40 kHz while the light adjusting frequency is about 1 kHz.

To set a target light quantity, a microcomputer, not shown, outputs set signals 0–255 in matching relation to a mode. A digital-to-analog converter (DAC), not shown, converts the signals 0–255 to an analog value. Remote voltages V1 and V2 are respectively applied to the remote voltage terminals of the light control circuits 201b and 202b in analog levels. Also, turn-on signals S1 and S2 are respectively sent to the light control circuits from a microcomputer which controls the sequence of the scanner section. The turn-on signals S1 and S2 go high at the beginning of a scanning operation and go low at the end of the same, thereby selectively turning on or turning off the associated lamps 201 and 202. In this way, since the TPS has an independent light control circuit for each lamp, it can turn on and turn off the individual lamps independently and change their light quantities with the turn-on signals S1 and S2 and remote voltage signals V1 and V2.

Figure 10:
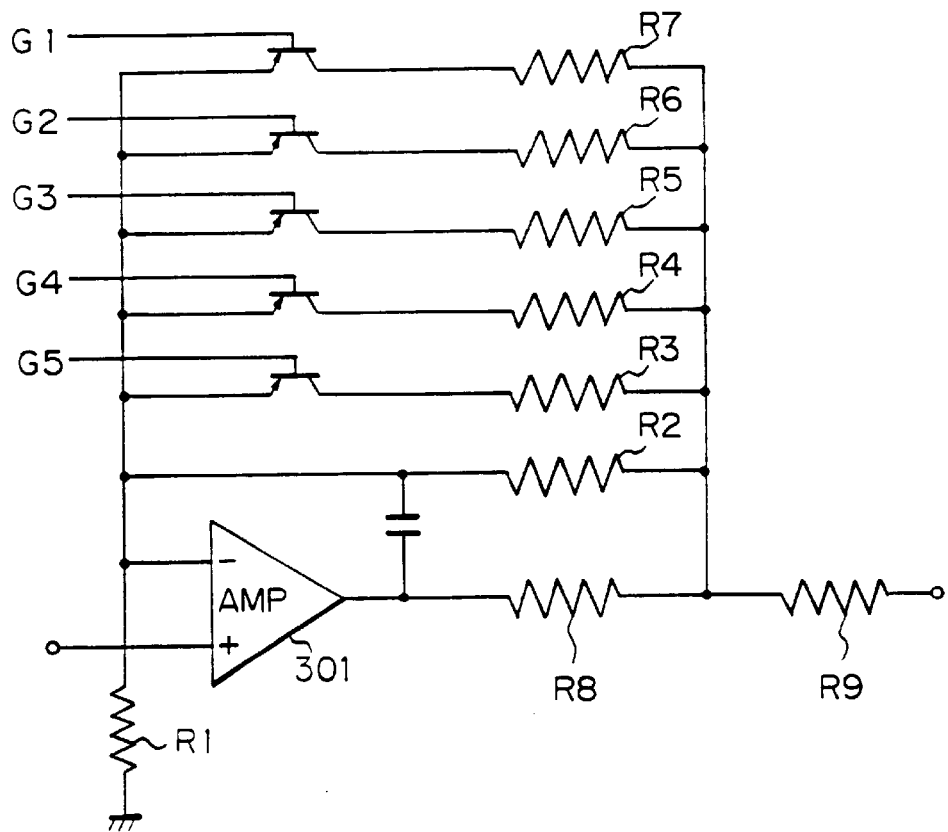
FIG. 10 is a circuit diagram showing a specific circuit included in the embodiment for amplifying scanner data.

The scanning unit 200 scans a sheet document and a book at rates of 120 mm/sec and 90 mm/sec, respectively, as mentioned previously. A charge accumulated in the image sensor 101 is determined by a product of incident optical power and accumulation time. Hence, the light control circuits 201b and 202b correct the difference in light accumulation time attributable to the difference in the linear velocity of the scanning unit 200. Specifically, assuming that an illumination value P is set for a book, a sheet document is scanned by an illumination value of 1.33P. Then, density data derived from a book and density data derived from a sheet document can be dealt with in the same manner. Further, when a circuit shown in FIG. 10 is used to set up a 1.33 times greater gain for a sheet document than for a book, the same light control effect is achievable.

Figure 5:
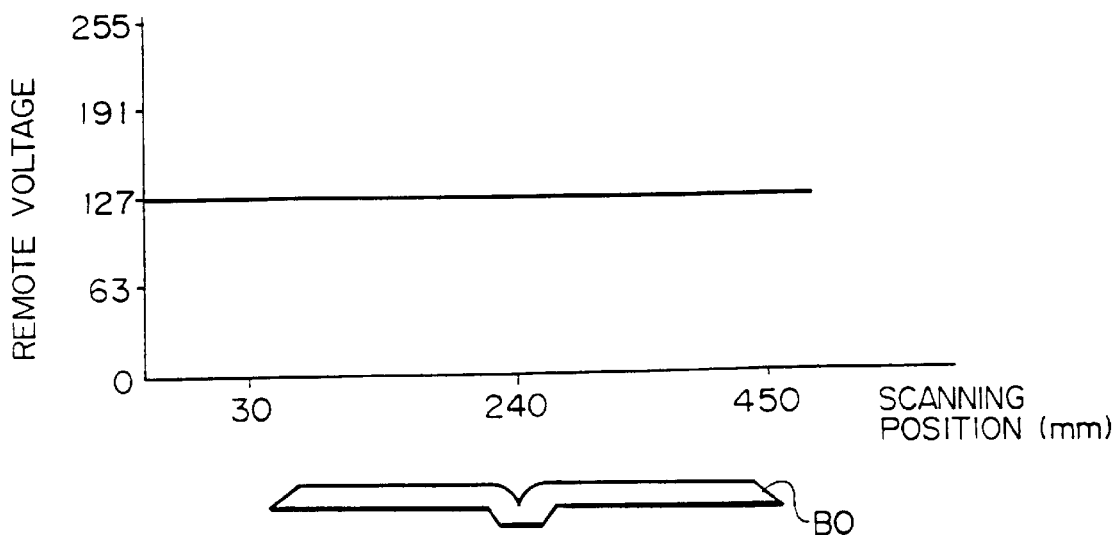
FIGS. 5 and 6 each shows quantities of light for illumination to issue in a particular condition.

Referring to FIGS. 5–9, specific light quantity distributions available with the above-described lamp drive system will be described. To begin with, FIG. 5 shows a case wherein both the lamps 101 and 102 are operated with a constant set light quantity from the beginning to the end of scanning.

Figure 6:
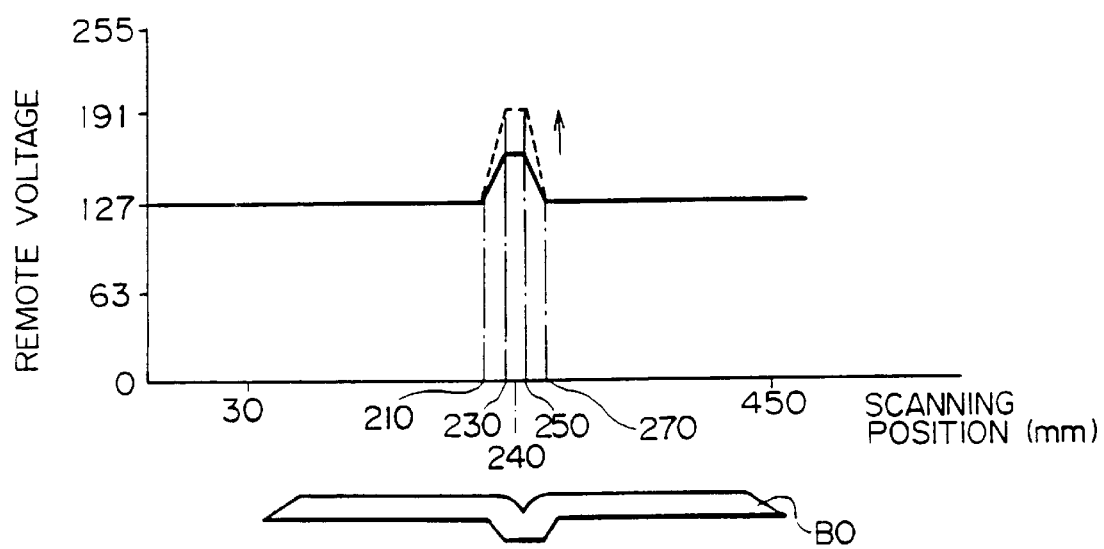
Figure 7:
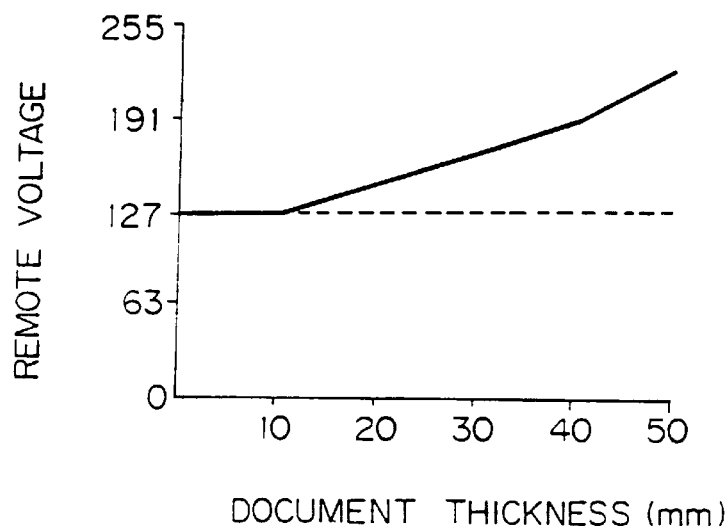
FIG. 7 is a graph indicative of a relation between the quantity of light for illumination and the thickness of a book document.

FIG. 6 shows a case wherein a remote voltage signal is manipulated to increase the light quantity at the bound portion BOa of the book BO. To increase the light quantity, a remote voltage signal is changed on the basis of a distance from a position where the scanning unit 200 starts scanning the document BO. Specifically; in FIG. 6, a remote voltage signal is sequentially increased from the scanning address of 210 mm to the scanning address of 230 mm of the scanning unit 200, thereby sequentially increasing the light quantity. Subsequently, the remote voltage signal is sequentially reduced from an address of 250 mm to an address of 270 mm, thereby sequentially reducing the light quantity. Alternatively, since the bound portion BOa of the book BO sequentially shifts in the right-and-left direction due to page turning, the light quantity may be controlled by calculating the position of the bound portion BOa on the basis of the result of edge detection, which will be described. The procedure shown in FIG. 6 prevents the density from increasing, i.e., the light quantity from decreasing despite the shadow appearing at the bound portion BOa. Furthermore, as indicated by a dashed line in FIG. 6, if the light quantity is increased depending on the thickness of the book BO, it is possible to correct short illumination attributable to the curvature of the bound portion BOa, and irregularities in density attributable to the scanning lens. For this correction, a sensor, not shown, senses the amount of opening or closing of a pair of slide plates of document tables, which will be described, which are used to support the bound portion BO (i.e. thickness of the bound portion BO). Then, as shown in FIG. 7, the light quantity of each lamp is increased at the bound portion BOa in matching relation to the thickness of the book BO.

Figure 8:
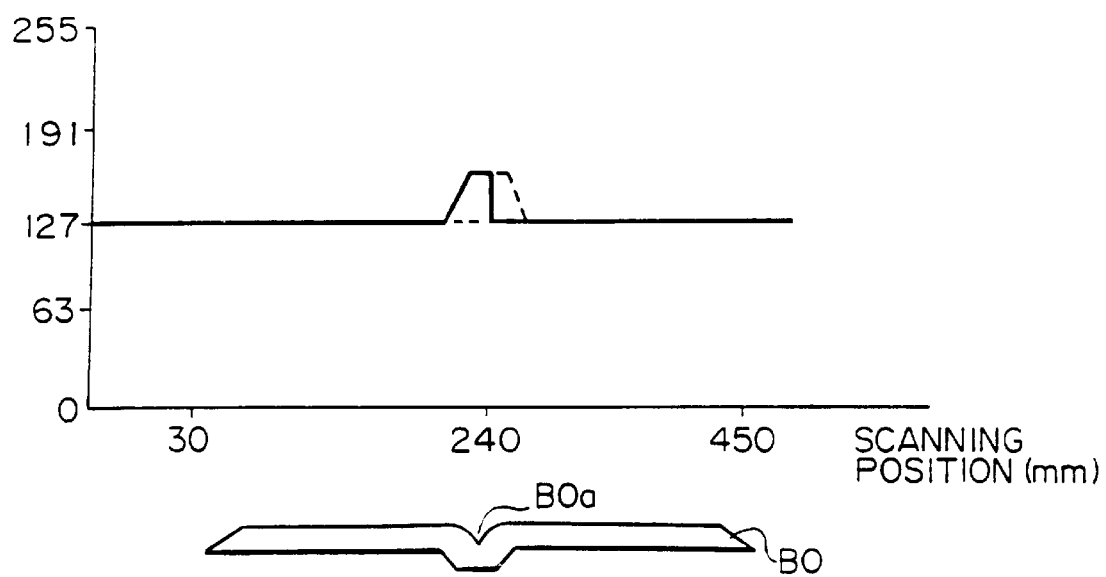
FIG. 8 is a graph showing quantities of light distributed asymmetrically at the bound portion of a book document.

FIG. 8 shows a case wherein the light quantities of the two lamps are increased asymmetrically in the right-and-left direction so as to prevent the density from increasing at the bound portion BOa of the book BO. In the figure, a solid line and a dashed line are respectively representative of set light quantities assigned to the right and left lamps. As shown, when the reading section of the scanning unit 200 approaches the bound portion BOa of the book BO and the document surface begins to incline downward to the right, the set light quantity of the right lamp is sequentially increased, as indicated by the solid line. As a result, the quantity of light incident to the document surface from the right perpendicularly thereto is increased to provide the background of the bound portion BOa with the same density as the background of the other portion. As soon as the reading section arrives at the center of the bound portion BOa, the light quantity of the right lamp is restored to the original value. Next, the set light quantity of the left lamp is sequentially increased from the position where the document surface begins to incline downward to the left, as indicated by the phantom line in the figure. As a result, the quantity of light incident to the document surface from the left perpendicularly thereto is increased to provide the background of the bound portion BOa with the same density as the background of the other portion. Subsequently, when the reading section arrives at the end of the right curved part of the bound portion BOa, the light quantity of the left lamp is restored to the original value. Thereafter, the lamps constantly emit the original set quantity of light.

Figure 9:
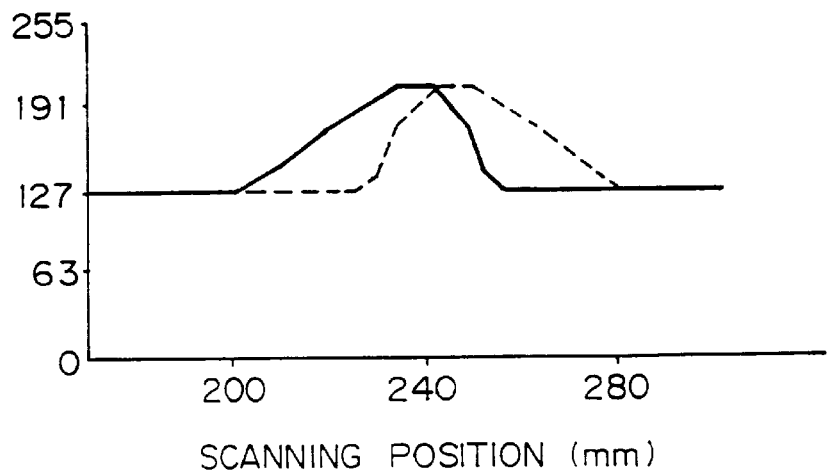
FIG. 9 is a graph similar to FIG. 8.

FIG. 9 plots in an enlarged scale the transitions of the quantities of light issuing from the right and left lamps as shown in FIG. 8. As the plot indicates, when the light quantities of the two lamps are sequentially changed, the density can be corrected in matching relation to the curvatures, or inclinations, of the bound portion BOa of the book BO. This eliminates stripe-like irregularity due to the jumps of density in the subscanning direction which are in turn attributable to the changes in light quantity at the bound portion BOa. When the light quantities of the two lamps are sequentially variable over 256 steps, as shown in FIG. 9 specifically, even the procedure shown in FIG. 6 achieves the same advantage.

How an irregular density distribution is corrected by the previously mentioned amplifying circuit, which amplifies image data read by the TPS, will be described hereinafter.

FIG. 10 shows a specific construction of the amplifying circuit. Briefly, as charges accumulated in the CCD image sensor 101 are transferred in the main scanning direction and subjected to clamping, sampling and holding, EVEN/ODD pixel combination and other waveform correction, the amplifying circuit variably amplifies the resulting analog signal. The amplified signal is digitized and then transferred to the IPU 103 as digital data. Specifically, as shown in FIG. 10, the amplifying circuit has an amplifier 301 which receives the analog image signal at an input VIN thereof, amplifies it, and then produces the amplified signal on an output VOUT. Labeled G1–G5 are 5-bit signal inputs for setting a data amplification value. Usually, an adequate gain calculated by shading correction is set on the inputs G1–G5 while an image is read. The amplification of the non-inverting amplifying circuit shown in FIG. 10 is determined by a resistance R defined by a resistor R1 and parallel resistors R2–R7 and is expressed as:

$$VOUT = VIN(1 + R/R1)$$

Therefore, with the amplifying circuit of FIG. 10, it is possible to select a magnification in thirty-two different steps, i.e., from about 6 magnifications to 450 magnifications, depending on the set value represented by the inputs G1–G5.

In the above condition, an alternative embodiment of the present invention adjusts the gain on the inputs G1–G5 so as to obviate irregularities in density attributable to the curvatures and shadows of the bound portion BOa of the book BO. Specifically, the amplification gain of input image data is increased depending on the distance from the position where the scanning unit 200 starts scanning the book BO. More specifically, when the scanning unit 200 approaches the bound portion BOa, the embodiment shifts the image data to a low density side for thereby maintaining the background density constant. For data correction, the embodiment manipulates the amplification value in the same manner as in the procedure of FIG. 6, i.e., increases the image data at the bound portion BOa, thereby reducing the image density. In detail, the amplification value of image data is sequentially increased from a scanning address of 210 mm to a scanning address of 230 mm of the scanning unit 200, and then sequentially reduced from an address of 250 mm to an address of 270 mm to the original value. This eliminates an increase in density due to the shadows to appear at the bound portion BOa. Further, by increasing the amplification value on the basis of the thickness of the book BO, it is possible to eliminate irregularities in density attributable to short illumination, which is in turn attributable to the curvatures of the bound portion BOa, as well as to the lens. For this purpose, a sensor, not shown senses the amount of opening or closing of a pair of slide plates used to support the book BO (i.e. thickness of the book), and the amplification value is increased at the bound portion BOa based on the thickness of the book BO, as described in relation to FIG. 7. Moreover, by sequentially changing the amplification value in the scanning direction, it is possible to correct density in matching relation to the curvatures or inclinations of the bound portion BOa and, therefore, to eliminate stripe-like irregularity due to the jumps of density in the subscanning direction which is in turn attributable to changes in light quantity at the bound portion BOa.

While the embodiment has been shown and described as changing the amplification value of analog image data, digitized image data may be shifted by subtraction or multiplication.

Generally, the curvatures and shadows of the bound portion BOa of the book BO occur at the same position in the main scanning direction. To reduce the irregularity in density attributable to the bound portion BOa, another alternative embodiment of the present invention samples image data in the main scanning direction, and then corrects image data on a main scanning line by real time processing based on a minimum density which is representative of the background of the book BO. Specifically, the embodiment determines the gain of the amplifying circuit shown in FIG. 10 on the basis of the peak value of image data on the preceding main scanning line. Alternatively, the embodiment may delay one line of image data with a FIFO memory, calculate the peak of minimum densities of sampled image data in the main scanning direction and representative of the background of the book BO, and then shift or multiply digital data on the basis of the peak such that the background density at the bound portion BOa becomes equal to that of page portions. Since the page portions of the book BO generally have a constant background density, the embodiment effects only a small amount of density correction in the page portions. Hence, using the minimum density representative of the background of the book BO has a minimum of side effect.

Assuming that an official gazette or similar book is laid in a spread position, then the number of left pages sequentially increases as the pages are turned over, and the left edge of the document sequentially shifts upward and rightward away from the cover of the document. At the same time, the number of right pages sequentially decreases while the right edge of the document shifts downward and rightward. FIGS. 11–13 each shows a specific relation between the number of pages turned over and the position of the left edge of a document. In the figures, the initial position of the left edge of a book laid in a spread position is assumed to be "0", and the amount of rightward shift of the left edge of the document is represented by a displacement. Further, in the figures, the rightward displacement of the left edge is assumed to be positive (plus) and shown in millimeters. FIGS. 11, 12 and 13 respectively pertain to a book which is 20 mm thick and has 750 pages in total, a book which is 12 mm thick and has 300 pages, and a book which is 9 mm thick and has 80 pages; all the books are of size B4 in a spread position. As FIGS. 11–13 indicate, although the left edge of a book sequentially shifts to the right as the pages thereof are turned over, the displacement does not always increase monotonously since the shape of the bound portion changes due to the displacement. Moreover, as shown in FIGS. 12 and 13, the displacement of the left edge locally decreases since the bound portion slides in the right-and-left direction while the pages are turned over. As for the thin book shown in FIG. 13, the left edge shifts even to the left (negative or minus direction). In addition, the displacement depends on the size and thickness of a book as well as on the quality of paper.

In the light of the above, the illustrative embodiment detects the edge of the spread page of a book on the basis of information read by the CCD image sensor 101 and, by using the edge position as a reference, determines the valid effective image range of the book (page surface of the spread book). This is successful in obtaining a valid image range suitable for inputting and printing an image without regard to the displacement of the edge of the document. In the embodiment, assuming that the book is of size A3 in a spread position, the edge of the book (edge of the cover) is about 210 mm remote from the central setting position and about 30 mm remote from the home position of the scanning unit, or paging turning unit, 200 with respect to the reading position.

Figure 14:
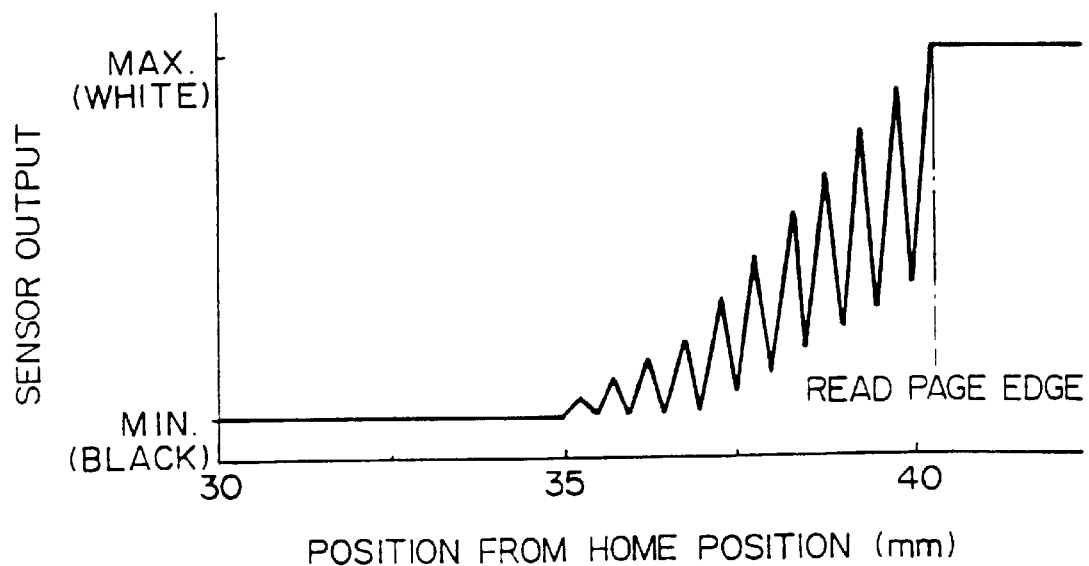
FIG. 14 is a graph indicative of data read from the edge portion of a book document by the scanning unit.

The embodiment detects the edge on the basis of changes, in the subscanning direction, in the information read by a particular pixel of the image sensor 101. FIG. 14 shows data read by the image sensor 101 at the edge portion of a book. An image representative of the left edge portion of a document is slightly blurred since the document surface is located below the focusing point of the image sensor 101. While the reading position is short of a book, the image sensor 101 reads a document table or the back cover of the book and, therefore, outputs data of the same level as black data. When the reading position reaches the edge portion of the book, a stripe pattern representative of the edges of the pages is sensed. Generally, most books have white background on their pages and have no text or graphic image over a distance of several ten millimeters as measured from the edge. Hence, when such a single color (white) continuously appears, the embodiment determines that the edge portion of the book has been detected. This is done by scanning the book in the opposite direction to the image reading direction at the end of a page turning operation.

By the above-described procedure, the embodiment is capable of determining a valid image range suitable for inputing and printing an image with no regard to the displacement of the edge of a book.

Figure 15:
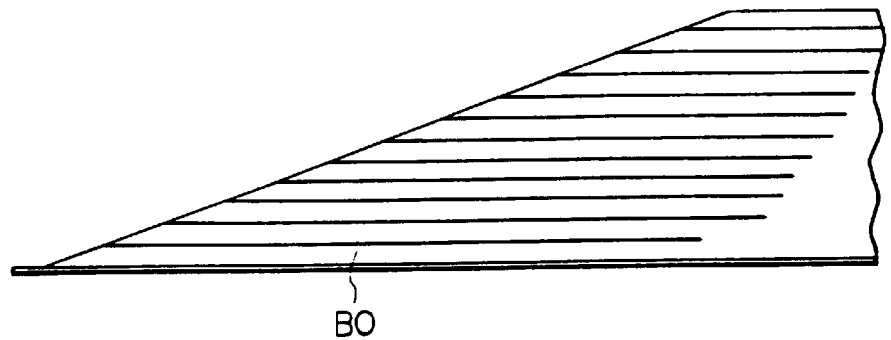
FIG. 15 is a fragmentary enlarged view of the edge portion of a book document.

As shown in FIG. 15, the edge portion of the spread book BO is made up of the edges of pages which are stacked in an inclined position. When illuminated in the direction opposite to the inclination of the edge portion, shadows appear at the edges of the pages with the result that a stripe pattern formed by the edges of the pages is read in an enhanced condition. The TPS illuminates the surface of a book with a pair of lamps from the right and left in order to read the right and left pages evenly and to read even the curvatures of the bound portion BOa of the book B. The embodiment, therefore, detects the edge of the book BO by turning off one of the two lamps or reducing the light issuing therefrom, thereby enhancing the stripe pattern formed by the edges of the page.

This promotes accurate detection of the edge portion of the book BO. Specifically, during the latter half of a page turning operation which occurs from the right to the left, the turn-on signal S2 and remote voltage V2 of the light control circuit FIG. 3, are manipulated to turn on only the right lamp 202. Also, when the edge of the right page of the spread document BO should be detected to lift the right page, as will be described, the turn-on signal S2 and remote voltage V2 are manipulated to turn off only the right lamp 202 at the end of the movement for reading the surface of the book BO.

The problem with the edge detection based on the edges of pages as described above is that an image pattern similar to the stripe pattern formed by the edges of the pages may exist on the pages of the book BO. Considering such an occurrence, another system for detecting the edge of the book BO compares an image derived from the illumination by the two lamps and an image derived from the illumination by only one of them. This successfully promotes accurate detection of the edge of the book BO. Specifically, the alternative system has a first mode in which one of the two lamps is turned off or reduced in light quantity to enhance the stripe pattern formed by the edges of the pages, and a second mode in which both of the lamps are turned on to enhance the stripe pattern. The system switches over the two modes and compare data read in the first and second modes. If the data derived from the first and second modes are different, the system determines that they are representative of the edge portion of the book BO. If the two data differ little, the system determines that they are representative of an image pattern existing on a flat surface, i.e., printed on the page of the book BO. More specifically, at the latter half of paging turning operation of the scanning unit 200 which occurs from the right to the left, the turn-on signals S1 and S2 and remote voltages V1 and V2 of the light control circuit, FIG. 3, are manipulated to switch over the turn-on of the lamps. At this instant, the lamps may be switched over every line, or the book BO may be scanned twice to store and compare the resulting data. If desired, such an alternative system may be executed only when the result of detection is questionable. In this way, the second system promotes accurate detection of the edge portion of the book BO.

Hereinafter will be described the construction of the scanner unit 30 included in the embodiment. Referring to FIG. 16, the upper half of the TPS is constituted by the scanner unit 30. The scanning unit 200 is movable in the right-and-left direction, as viewed in FIG. 16, within the scanner unit 30.

As shown in FIG. 16, a right and a left press rollers 281a and 281b are rotatably mounted on the underside of the scanning unit 200. A right and a left take-up roller 280a and 280b, respectively, are also rotatably mounted on the underside of the scanning unit 200 outboard of the press rollers 281a and 281b, respectively. The right and left press sheets 282a and 282b, which are separate from each other, have their inner ends wrapped around the take-up rollers 280a and 280b, respectively. The outer ends of the sheets 282a and 282b are respectively affixed to the side walls of the scanner unit 30.

The take-up roller 280a has a shaft, a hollow cylinder 280a surrounding the shaft, and a spiral spring anchored to the shaft and cylinder 280a at opposite ends thereof. When the shaft is further rotated from a position which stretches the associated press sheet 282a, a certain degree of tension can be exerted on the sheet 282a by the action of the spiral spring. The other take-up roller 280b also has a shaft, a hollow cylinder 280b, and a spiral spring.

As shown in FIG. 16, the glass platen 205 for reading the book BO and the turn belt 208 for turning the pages of the book BO are located between the press rollers 281a and 281b. In the illustrative embodiment, the glass platen 205 and the turn belt 208 are respectively positioned at the upstream side and the downstream side in the direction in which the scanning unit 200 reads the book BO. This increases the distance available for the approach run of the scanning unit 200 and, therefore, stabilizes the scanning of the unit 200. In addition, the embodiment locates the page turning mechanism in the lower portion of the scanning unit 200 and the optics in the upper portion of the same unit 200, thereby reducing the overall size of the PTS.

As shown in FIG. 16, the fluorescent lamps 201 and 202 are disposed above the glass platen 205 and at the right and left sides of the reading section. As the lamps 201 and 202 illuminate the book BO, the resulting imagewise reflection is reflected by a first mirror 219, reflected by a second mirror 220 and a third mirror 221 alternately, and then routed through a lens 216 to the CCD image sensor 101 to form a reduced image.

The turn belt 208 is passed over the previously mentioned belt drive roller 223 and a roller 224. A charge roller 225 is held in contact with the upper run of the turn belt 208 at a position slightly spaced apart from the belt drive roller 224.

Figure 17:
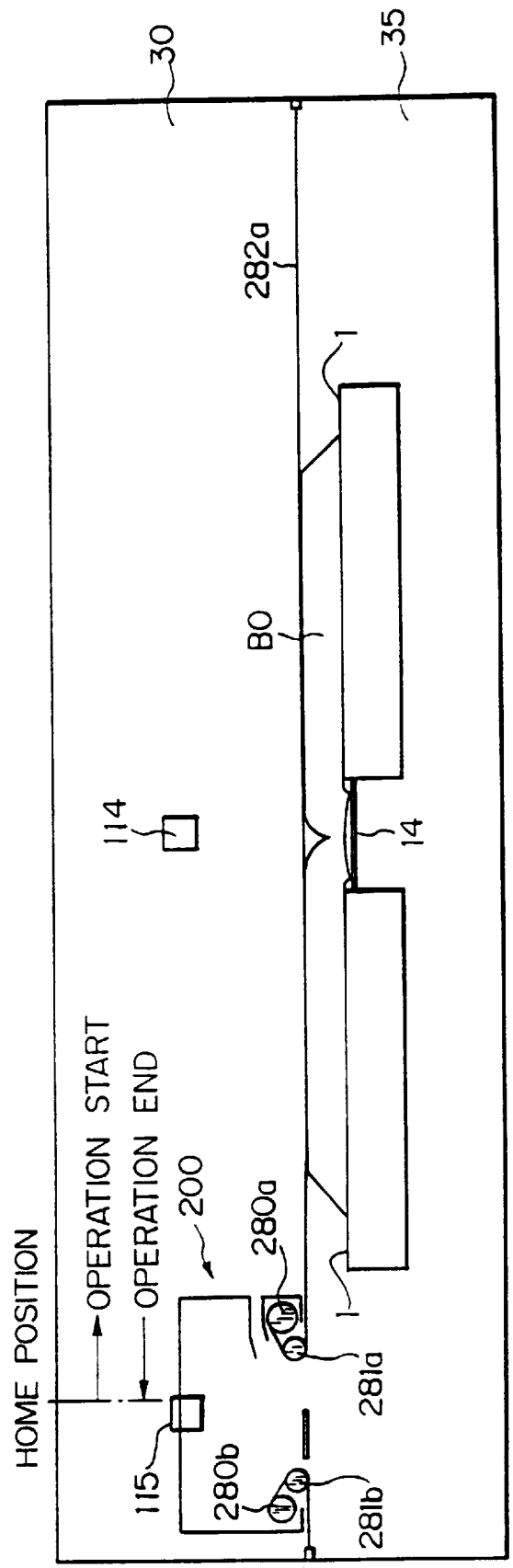
Figure 18:
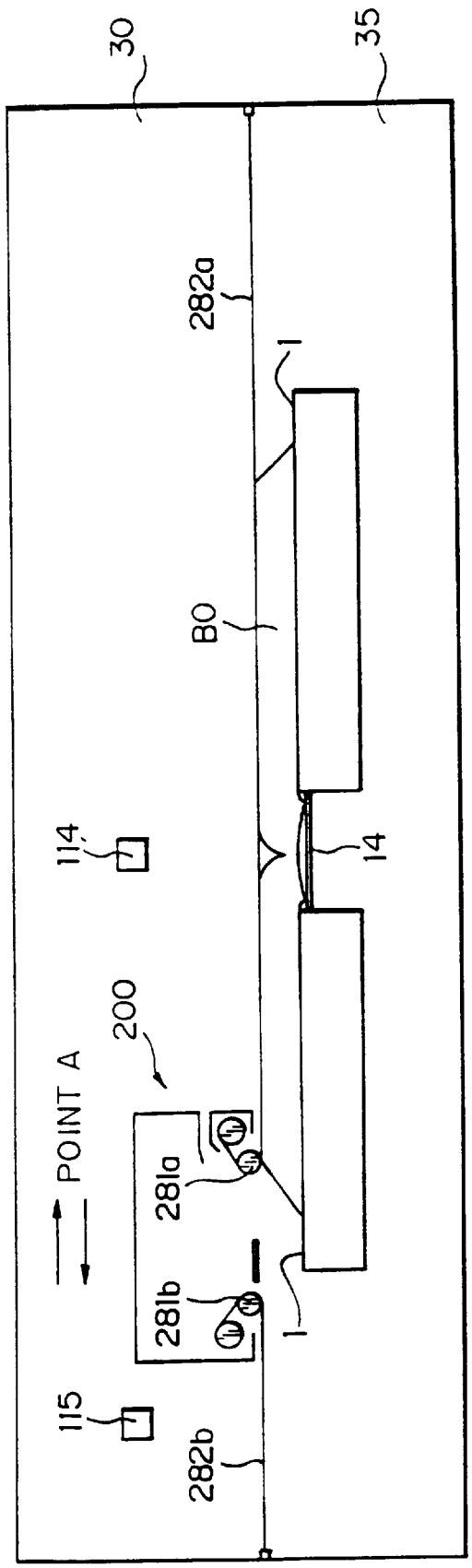
Figure 19:
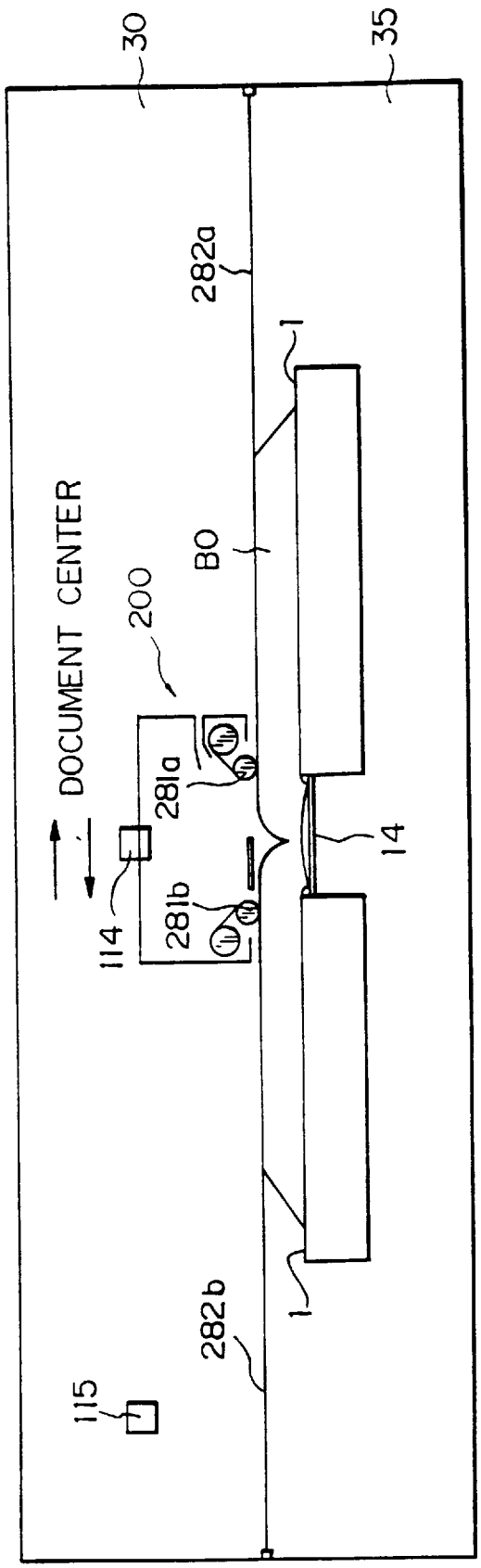

FIGS. 17–21 demonstrate the movement of the scanning unit 200 in the table press/fix mode. FIG. 22 is a timing chart associated with FIGS. 17–21. As shown in FIG. 17, the end home position of the scanning unit 200 defines a point where the scanning unit 200 starts on a reading and page turning movement and a point where it ends such a movement. At the end home position, the scanning unit 200 does not overlie the table 1. In the table press/fix mode, the scanner motor 106 of the scanning unit 200 is driven in the forward direction to move the unit 200 to the right, as viewed in FIG. 17. When a right press roller 281a included in the scanning unit 200 arrives at the left edge of the book BO (point A, FIG. 18), the left table motor 61 is rotated in the forward direction to raise the left table 1. As a result, the book BO is pressed against the scanning unit 200 and, therefore, read in an optimal condition. As shown in FIG. 19, slightly before the scanning unit 200 arrives at the center of the book BO, the right press roller 281a reaches the left end of the right table 1 (point B, FIG. 42). At this time, the right table motor 61 is driven in the forward direction to raise the right table 1. Subsequently, the scanning unit 200 moves over the center of the book BO and starts reading the right page of the book BO. When a left press roller 281b arrives at the right end of the left table 1 (point C, FIG. 22), the left table motor 61 is deenergized to restore the right table 1 to the fixed state. As a result, the book BO is fixed in place by being pressed by a press sheet 282b and without protruding into the scanner unit 30. The book BO is held at this level until the scanning unit 200 moves over it again.

Figure 20:
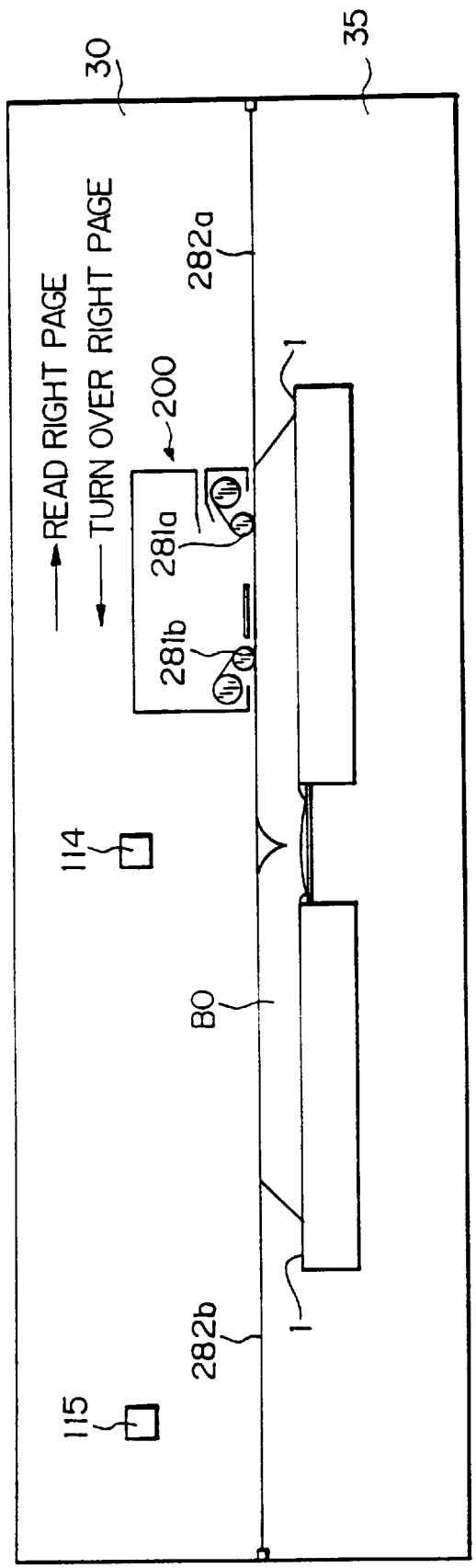

FIG. 20 shows the operation of the scanning unit 200 to occur when the unit 200 reads the right page of the book BO or turns the right page thereof. The scanning unit 200 read the right page of the book BO is brought to a stop when the left press roller 281b arrives at the right end of the right table 1 (point D, FIG. 21). Then, the scanner motor 106 is reversed to move the scanning unit 200 to the left, as viewed in FIG. 21. As a result, the scanning unit 200 moves to the left while carrying the right page or leaf of the book BO therewith. Slightly before the scanning unit 200 reaches the center of the book BO, FIG. 19, the left press roller 281b arrives at the right end of the left table 1 (point C). At this time, the left table motor 61 is driven in the forward direction to raise the left table 1. As the scanning unit 200 moves over the center of the book BO, it starts laying the right page on the left page. Subsequently, the right press roller 281a reaches the left end of the right table I (point B). At this time, the right table motor 61 is deenergized to restore the right table 1 to the fixed position. As a result, the book BO is fixed in place by being pressed by a press sheet 282a and without protruding into the scanner unit 30. The book BO is held at this level until the scanning unit 200 moves over it again. Finally, the scanning unit 200 is brought to a stop at the end home position shown in FIG. 17.

In summary, it will be seen that the present invention provides an image reading device capable of preventing the quantity of light for illumination from becoming short at the center or bound portion of a book document and preventing density from becoming irregular at such a portion of a book document. In addition, the device of the present invention allows the edge of a spread document to be detected with reliability.

Various modifications will become possible for those skilled in the art after receiving the teachings of the present disclosure without departing from the scope thereof.

What is claimed is:

1. An image reading device comprising:

a document table for supporting a bound book document in a spread open position having an exposed inside area which is delineated in part by opposite side edges;

an image scanning mechanism having an image reading part for providing an image signal and an illumination part for providing an illuminated scanning sub-area, said image scanning mechanism causing said image reading part, said illumination part, and said illuminated scanning sub-area to all move together in a scanning direction;

said illumination part including a plurality of light sources at least one of which is positioned downstream relative to the movement of the illuminated scanning sub-area in the scanning direction and at least one other of which is positioned upstream relative to the movement of the illuminated scanning sub-area in the scanning direction; and a control arrangement for automatically controlling light output levels from said light sources such that at least at each of said opposite side edges, said illuminated scanning sub-area is formed by light impinging predominantly from a direction that will enhance shadows cast by said opposite side edges.

2. An image reading device as claimed in claim 1, wherein said controller further automatically controls the light output levels of said light sources to minimize any shadows being cast when said illuminated scanning area is moved over an inside binding area associated with the spread open bound book document.

3. An image reading device as claimed in claim 1, wherein said controller controls said light output levels of said light sources by limiting the amount of light that can be produced by an individual light source.

4. An image reading device as claimed in claim 3, wherein the limiting of the amount of light produced by said individual light source includes completely removing power from said individual light source.

5. An image reading device as claimed in claim 1, further comprising:

a side edge detecting device connected to said image reader part and responsive to said image signal to provide an output signal indicating detection of one of the side edges.

6. An image reading device as claimed in claim 5, wherein said edge indicating device output signal is provided to said scanning mechanism as a control signal producing a change in said scanning direction.

7. An image reading device as claimed in claim 1, further comprising:

a page turning mechanism for turning a page of the bound book document to expose a new inside surface area.

* * * * *